US012769641B2

(12) United States Patent
Kake et al.

(10) Patent No.: US 12,769,641 B2
(45) Date of Patent: Oct. 20, 2026

(54) INFORMATION PROCESSING APPARATUS, INFORMATION PROCESSING METHOD, AND PROGRAM

(71) Applicant: Sony Interactive Entertainment Inc., Tokyo (JP)

(72) Inventors: Tomokazu Kake, Tokyo (JP); Daichi Ono, Tokyo (JP); Yutaro Miyauchi, Tokyo (JP); Satoshi Nakajima, Tokyo (JP); Korechika Tamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 335 days.

(21) Appl. No.: 18/561,306

(22) PCT Filed: May 26, 2021

(86) PCT No.: PCT/JP2021/019987

§ 371 (c)(1),
(2) Date: Nov. 16, 2023

(87) PCT Pub. No.: WO2022/249328

PCT Pub. Date: Dec. 1, 2022

(65) Prior Publication Data

US 2024/0248837 A1 Jul. 25, 2024

(51) Int. Cl.
*G06F 11/3668* (2025.01)
*G06F 11/3698* (2025.01)
(Continued)

(52) U.S. Cl.
CPC ...... *G06F 11/3688* (2013.01); *G06F 11/3698* (2025.01); *G06V 20/62* (2022.01); *G06V 30/10* (2022.01); *G06V 2201/02* (2022.01)

(58) Field of Classification Search
None
See application file for complete search history.

(56) References Cited

U.S. PATENT DOCUMENTS 9,600,519 B2 * 3/2017 Schöning ................ G06F 16/24
10,216,377 B2 * 2/2019 Ozcan .................. G06F 40/197
(Continued)

FOREIGN PATENT DOCUMENTS

JP 2012-248097 A 12/2012
JP 6861880 B1 4/2021
(Continued)

OTHER PUBLICATIONS

International Search Report and Written Opinion mailed on Aug. 24, 2021, received for PCT Application PCT/JP2021/019987, filed on May 26, 2021, 9 pages including English Translation.

*Primary Examiner* — William L Bashore
*Assistant Examiner* — Koorosh Nehchiri
(74) *Attorney, Agent, or Firm* — Kilpatrick Townsend & Stockton LLP

(57) ABSTRACT

Disclosed is an information processing apparatus for acquiring a plurality of display screens that are displayed chronologically while a target program is executed, identifying, on the basis of the plurality of display screens, a plurality of scenes presented by the target program and transition relations between the scenes, and generating a transition diagram that indicates a transition between the scenes.

20 Claims, 2 Drawing Sheets

(51) Int. Cl.
*G06V 20/62* (2022.01)
*G06V 30/10* (2022.01)

(56) References Cited

U.S. PATENT DOCUMENTS

| | | | | |
|---|---|---|---|---|
| 2013/0004087 | A1* | 1/2013 | Kumar | G06V 10/751 382/218 |
| 2014/0075344 | A1* | 3/2014 | Bentrup | G06F 11/3684 715/760 |
| 2014/0258989 | A1* | 9/2014 | Moon | G06F 11/3688 717/127 |
| 2015/0082280 | A1* | 3/2015 | Betak | G06F 11/3688 717/124 |
| 2015/0127732 | A1* | 5/2015 | Zhang | H04L 67/1095 709/204 |
| 2015/0248190 | A1* | 9/2015 | Matsumoto | G06F 40/106 715/746 |
| 2019/0156122 | A1* | 5/2019 | Lu | G06V 10/761 |
| 2022/0147437 | A1* | 5/2022 | Chen | G06N 20/00 |

FOREIGN PATENT DOCUMENTS

| | | | |
|---|---|---|---|
| WO | 2014005439 | A1 | 1/2014 |
| WO | 2020/213371 | A1 | 10/2020 |
| WO | 2020/240778 | A1 | 12/2020 |

* cited by examiner

INFORMATION PROCESSING APPARATUS, INFORMATION PROCESSING METHOD, AND PROGRAM

CROSS-REFERENCE TO RELATED APPLICATION

The present application is based on PCT filing PCT/JP2021/019987, filed May 26, 2021, the contents of which are incorporated by reference.

TECHNICAL FIELD

The present invention relates to an information processing apparatus, an information processing method, and a program that process information regarding an application program.

BACKGROUND ART

When an application program is to be created, tests are conducted to determine whether or not the application program operates normally. Further, such tests need to be performed not only at the time of initial creation of the application program but also at various points of time. For example, in some cases where an update is performed on system software (basic software) providing an execution environment for the application program, operation tests need to be performed for a plurality of application programs running on the system software.

SUMMARY

Technical Problem

In a case where a wide variety of programs and test items are to be tested, the execution of the above-mentioned tests is time consuming. It is therefore desired that, for example, determination of test items and execution of tests be achieved with high efficiency.

The present invention has been made in view of the above circumstances. An object of the present invention is to provide an information processing apparatus, an information processing method, and a program that are able to efficiently determine test items and execute tests as appropriate for an application program.

Solution to Problem

According to an aspect of the present invention, there is provided an information processing apparatus including a screen acquisition section for acquiring a plurality of display screens that are displayed chronologically while a target program is executed, a scene identification section for identifying, on the basis of the plurality of display screens, a plurality of scenes presented by the target program and transition relations between the scenes, and a transition diagram generation section for generating a transition diagram that indicates a transition between the scenes.

According to another aspect of the present invention, there is provided an information processing method including a step of acquiring a plurality of display screens that are displayed chronologically while a target program is executed, a step of identifying, on the basis of the plurality of display screens, a plurality of scenes presented by the target program and the transition relations between the scenes, and a step of generating a transition diagram that indicates a transition between the scenes.

According to still another aspect of the present invention, there is provided a program for causing a computer to execute a step of acquiring a plurality of display screens that are displayed chronologically while a target program is executed, a step of identifying, on the basis of the plurality of display screens, a plurality of scenes presented by the target program and the transition relations between the scenes, and a step of generating a transition diagram that indicates a transition between the scenes. The program may be supplied on a non-transitory computer-readable information storage medium.

DESCRIPTION OF EMBODIMENT

An embodiment of the present invention will now be described with reference to the accompanying drawings.

Figure 1:
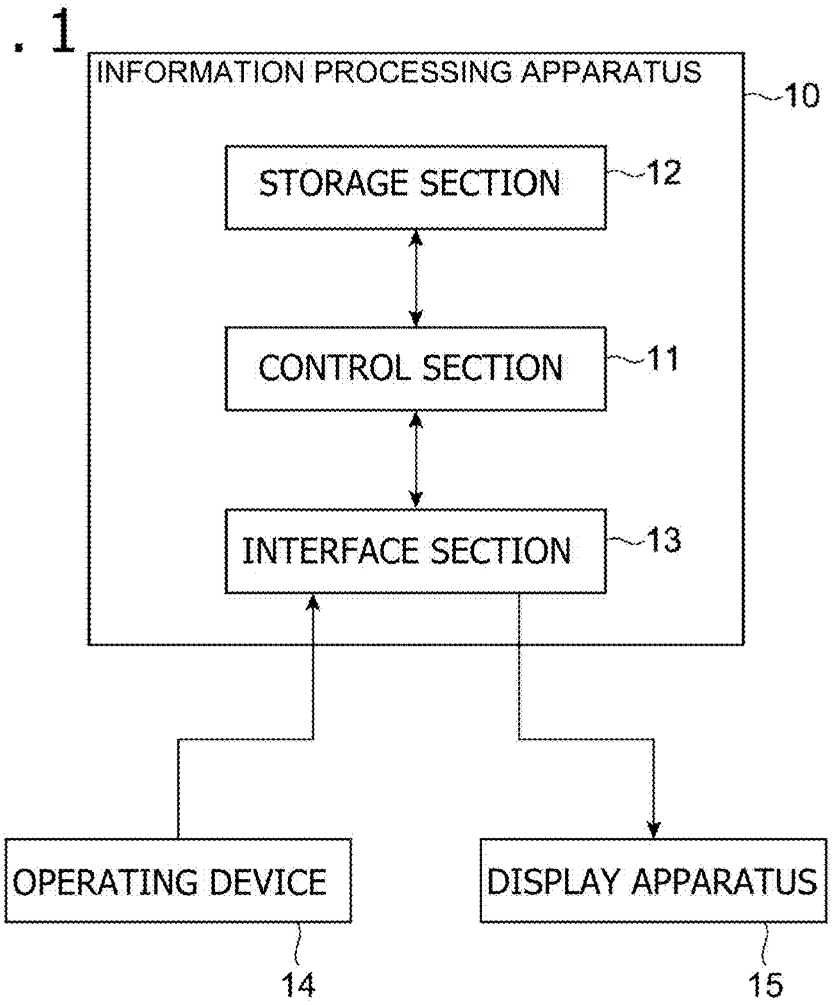
FIG. 1 is a block diagram illustrating a configuration of an information processing apparatus according to an embodiment of the present invention.

FIG. 1 is a block diagram illustrating a configuration of an information processing apparatus 10 according to the embodiment of the present invention. The information processing apparatus 10 is a personal computer or other information processing apparatuses, and includes include a control section 11, a storage section 12, and an interface section 13 as depicted in FIG. 1. Further, the information processing apparatus 10 is connected to an operating device 14 and a display apparatus 15.

The control section 11 includes at least one processor, such as a computer processing unit (CPU), and performs various information processing tasks by executing a program stored in the storage section 12. Note that specific examples of processing performed by the control section 11 in the present embodiment will be described later. The storage section 12 includes at least one memory device, such as a random access memory (RAM), and stores the program to be executed by the control section 11 and data to be processed by the program.

The interface section 13 is an interface for establishing data communication with the operating device 14 and the display apparatus 15. The information processing apparatus 10 is wired or wirelessly connected to, through the interface section 13, both the operating device 14 and the display apparatus 15 in order to transmit and receive data to and from various apparatuses.

The operating device 14 is a device for receiving operating instructions from a user and transmitting operating signals indicating contents of the received operating instructions to the information processing apparatus 10. The operating device 14 may include, for example, a keyboard and a mouse. The display apparatus 15 receives a video signal transmitted from the information processing apparatus 10, and displays video based on the received video signal to prompt the user to view the displayed video.

Functions implemented by the information processing apparatus 10 will now be described. The information processing apparatus 10 is used to determine test items of an application program to be tested (hereinafter referred to as the target program). In the present embodiment, it is assumed that, while being executed, the target program presents a plurality of scenes to the user, and, for example, according to user operations and with the progress of processing, changes the scenes to be presented.

Incidentally, in the present embodiment, the target program is not limited to a program executed by the information processing apparatus 10, and may alternatively be a program executed by a separate computer (e.g., a smartphone, a tablet, or a home video game console).

Figure 2:
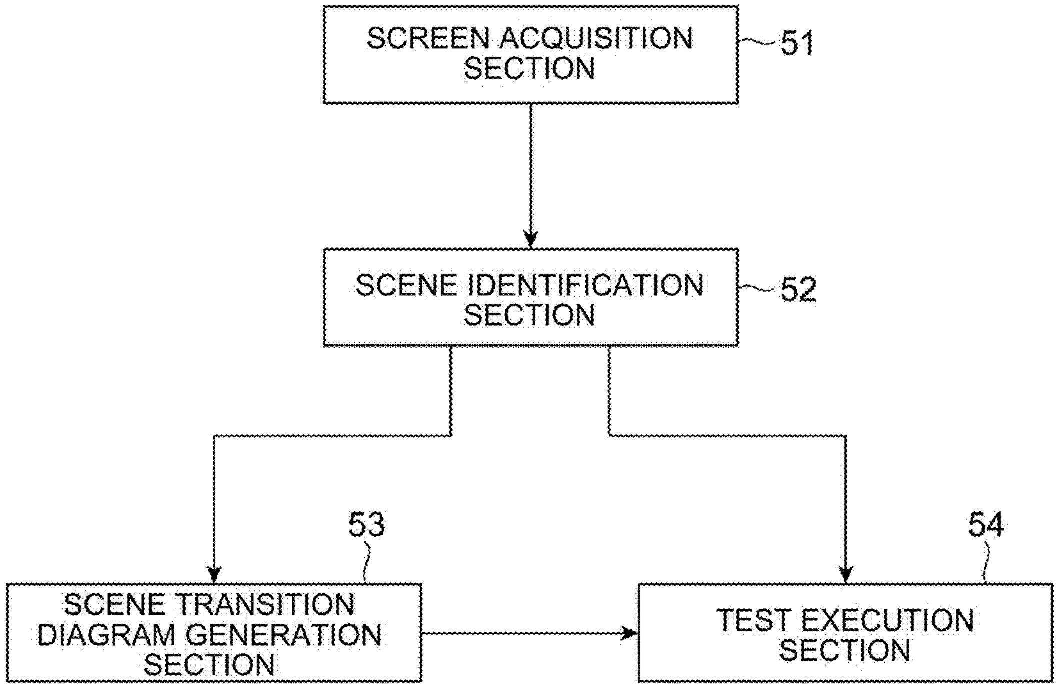
FIG. 2 is a functional block diagram illustrating the information processing apparatus according to the embodiment of the present invention.

As depicted in FIG. 2, the information processing apparatus 10 functionally includes a screen acquisition section 51, a scene identification section 52, a scene transition diagram generation section 53, and a test execution section 54. The functions of these sections are implemented when the control section 11 executes a program stored in the storage section 12. The program may be supplied to the information processing apparatus 10 through a communication network such as the Internet or supplied on a computer-readable information storage medium such as an optical disk.

The screen acquisition section 51 acquires display screen data including a plurality of display screens that are displayed chronologically when the target program is executed. Note that the target program may be directly executed by the information processing apparatus 10 or may be executed by a separate computer. In a case where the target program is executed by the separate computer, the display screen data to be acquired by the screen acquisition section 51 may be the contents of a video signal outputted upon target program execution or may be screen capture data acquired when the separate computer records a screen displayed upon target program execution.

The display screen data includes images of display screens that are actually displayed upon target program execution. For example, in a case where the target program is a game program, the display screen data may include data of a series of display screens that are displayed when a person in charge of testing actually starts the game program to play a game. Further, the display screen data may include data of screens that are acquired when the information processing apparatus 10 automatically executes the target program. In this case, the information processing apparatus 10 automatically executes the target program according to data indicating the contents of pre-specified operations.

The display screen data may include all frame images that are displayed when a series of target programs are executed or may include only some of the frame images. For example, the screen acquisition section 51 may include data of display screens that are displayed at predetermined time intervals. Further, the screen acquisition section 51 may include data of display screens that are displayed at a point of time when a predetermined operation input is performed.

Further, it is assumed that the screen acquisition section 51 additionally acquires operation data indicating the contents of operations inputted at the time of target program execution. The operation data includes information indicating the contents of operations (e.g., the type of a depressed button) and a point of time when such an operation has been performed. Moreover, the screen acquisition section 51 may additionally acquire various items of information that the target program outputs for presentation to the user, such as sounds to be reproduced during target program execution and vibrations to be generated by a vibration device.

Based on the display screen data and operation data acquired by the screen acquisition section 51, the scene identification section 52 identifies the scenes to be presented to the user during target program execution. In this instance, the individual scenes to be identified by the scene identification section 52 may be identified according to the type of displayed content. Alternatively, the individual scenes to be identified by the scene identification section 52 may be identified according to the type of acceptable operations. For example, a menu screen displaying a plurality of menu items and prompting the user to select one of the displayed menu items is regarded as a scene. When the user selects a menu item from such a scene and applies the menu item selection, the display of the menu items, which are displayed as selectable candidates, terminates, so that no further menu item selection operations are acceptable. As described above, the scene of the menu screen terminates at a point of time when the type of operation acceptable by the target program changes. As a result, the scene to be presented by the target program is considered to have transitioned to the next scene.

More specifically, the scene identification section 52 inputs, to a prepared identifier, input data generated based on the display screen data which is acquired by the screen acquisition section 52, in order to identify the scene presented by each display screen included in the display screen data. This results in identifying the scenes that are actually presented by the target program when the display screen data is recorded. At least a part of the identifier may be generated in advance by machine learning.

Further, in a case where the scene to be identified presents a plurality of selectable options to the user, the scene identification section 52 may identify the selectable options to be presented concurrently. The identified selectable options are used for identifying a scene-to-scene transition as described later. Further, the scene identification section 52 may identify the contents of operation input triggering the scene-to-scene transition by using the operation data together with the display screen data as an input. Specific examples of processing performed for scene identification by the scene identification section 52 will be described later.

The scene transition diagram generation section 53 generates a scene transition diagram based on the result of identification by the scene identification section 52. Then, in accordance with instructions, for example, from the person in charge of testing, the scene transition diagram generation section 53 displays the generated scene transition diagram on the screen of the display apparatus 15. The scene transition diagram may be a diagram indicating the transition relations between the scenes presented by the target program, and may be formed by a directed graph in which nodes indicate individual scenes and edges indicate scene-to-scene transitions.

Further, the scene transition diagram may include information regarding the contents of operation input necessary for scene-to-scene transitions and the selectable options chosen for scene transition. For example, in a case where, the scene identification section 52 identifies the start of presentation of scene B at a point of time when a button is operated during the presentation of scene A, the transition from scene A to scene B is estimated to have been caused by such a button operation. Accordingly, the scene transition diagram generation section 53 displays an icon representing the button together with an arrow indicating such a scene transition. Further, in a case where the result of identification indicates that a plurality of selectable options are displayed in scene A, the scene identification section 52 is able to identify a chosen selectable option at a point of time when transition occurs from scene A to scene B by analyzing the contents of the display screen of scene A. This enables the scene identification section 52 to estimate that a transition to scene B has occurred because the selectable option has been chosen in scene A. The scene transition diagram generation section 53 displays the contents of the selectable options together with an arrow indicating such a scene transition. This enables the person in charge of testing to understand what operations have caused the scene-to-scene transition.

Figure 3:
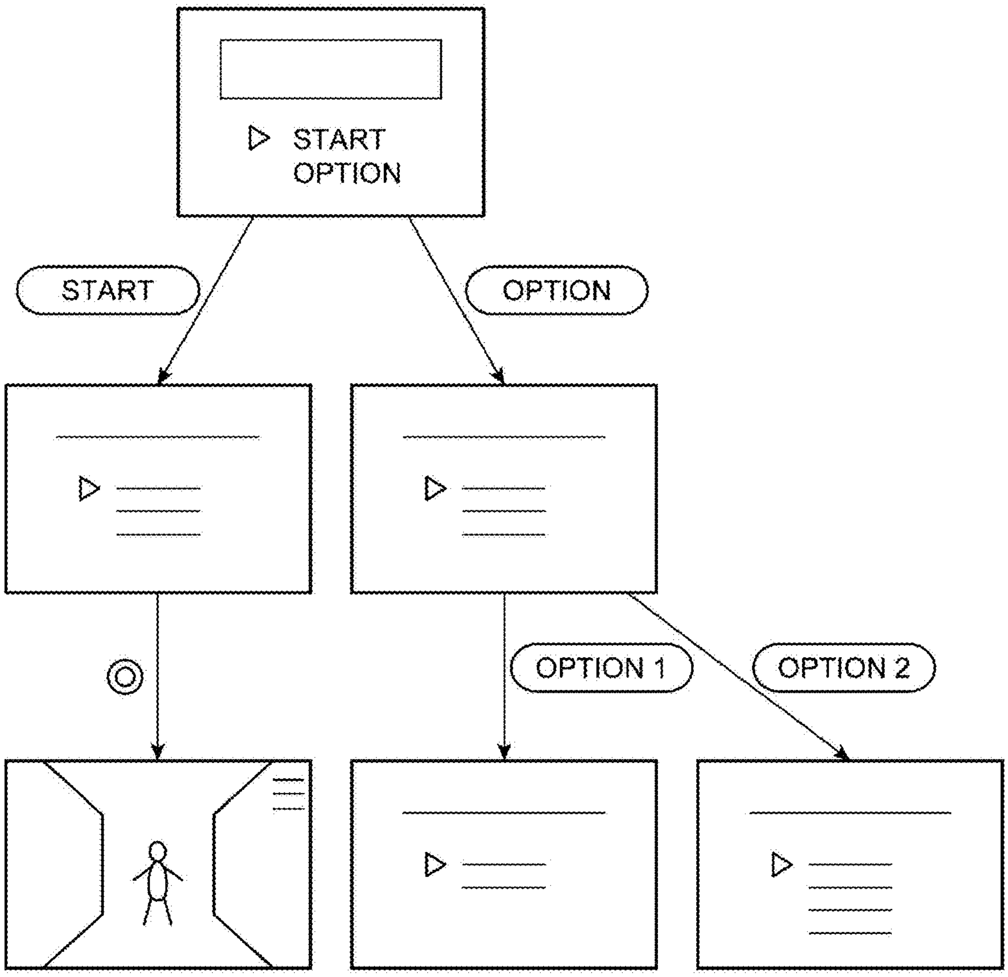
FIG. 3 is a diagram illustrating an example of a scene transition diagram.

FIG. 3 is a diagram illustrating an example of the scene transition diagram that is generated by the scene transition diagram generation section 53. The example of FIG. 3 depicts a game program as the target program, and illustrates a part of the scene transition diagram including, for example, the scene of the menu screen displayed at the start of a game.

Note that the scene transition diagram generation section 53 need not always use the results of identification obtained by allowing the scene identification section 52 to identify all scenes and transitions. Alternatively, the scene transition diagram generation section 53 may generate the scene transition diagram by additionally using data manually prepared, for example, by a target program creator and the person in charge of testing.

The test execution section 54 automatically test the target program. For example, by selecting scenes in the scene transition diagram while the scene transition diagram generated by the scene transition diagram generation section 53 is displayed, the person in charge of testing may specify the test procedure to be performed. The test execution section 54 executes the target program, and performs an operation input for the target program so as to sequentially display the scenes selected by the person in charge of testing. In this instance, when the contents of operation input necessary for scene-to-scene transitions have been identified as mentioned earlier, by reproducing such an operation input, the test execution section 54 is able to test the target program while automatically transitioning between the scenes.

Further, when displaying the scene transition diagram, the scene transition diagram generation section 53 may, for example, highlight scenes and transitions already tested by the test execution section 54 in order to differentiate the tested scenes and transitions from the other scenes and transitions. As a result, the person in charge of testing is able to intuitively recognize, for example, the tested scenes and untested scenes. Further, in a case where testing is conducted by a plurality of person in charge of testing, the scenes and transitions tested by each person in charge of testing may be displayed in an identifiable manner. This makes it possible to avoid a risk, for example, of failure to test some test items, in a case where testing is conducted by a plurality of person in charge of testing.

Moreover, even when executing a test, the information processing apparatus 10 may cause the screen acquisition section 51 to acquire display screen data, cause the scene identification section 52 to identify the scenes, and cause the test execution section 54 to reference the result of identification and automatically start the test. More specifically, the screen acquisition section 51 acquires, in real time, data of display screens to be displayed during test execution, and the scene identification section 52 identifies, in real time, what scenes are presented by the acquired display screens. In this case, scene identification may be made by using the same identifier as used for generating the scene transition diagram. Based on the result of such scene identification, the test execution section 54 determines the contents of operations. For example, in a case where transition is to be made from scene A to scene B during test execution, the test execution section 54 inputs an operation for making the transition to the target program at a point of time when the display of scene A is identified by the scene identification section 52. Exercising the above control makes it possible to perform an operation input at an appropriate point of time and automatically execute the target program in such a manner as to minimize the possibility of performing an erroneous operation.

In some cases, automated execution may be difficult depending on the contents of operations. For example, in some cases where a game requiring real-time operations is being executed, it may be difficult for the test execution section 54 to automatically perform a reproducible operation input. Accordingly, when displaying the scene transition diagram to specify the test procedure, the person in charge of testing may be allowed to specify, for example, a portion to be automatically executed and a portion to be manually operated by the person in charge of testing. This makes it possible to automatically execute some operations to eliminate the need for manual operations and conduct a series of operation tests including portions difficult to automatically execute.

Using the information processing apparatus 10 according to the present embodiment described above makes it possible to save labor required for testing in a case, for example, where the target program is tested repeatedly or tested in a situation where an execution environment is changed. Specific test preparations and specific examples of testing are described below.

As mentioned earlier, by inputting the display screen data acquired by the screen acquisition section 51 to the identifier, the scene identification section 52 identifies what scenes are displayed by the individual display screens included in the display screen data. The identifier may be generated by machine learning. The transition of the scenes sequentially presented by the target program can be accurately identified by using an algorithm such as a recurrent neural network designed to sequentially input chronologically acquired data.

As a specific example, it is now assumed that the procedure for performing operation tests on the target program is first determined by the person in charge of testing, and that the tests are manually executed in accordance with the determined procedure. For example, if the target program is a game program, the operation tests are executed by performing a series of steps of changing settings from a start screen after target program startup, selecting the level of difficulty, and playing a game until the game is over. In such a case, the target program presents the user with various screens, such as a start screen, a setting change screen, a difficulty level selection screen, a game play screen, and a game-over screen. The information processing apparatus 10 does machine learning by using, as an input, the display screen data obtained from the above-mentioned test execution. In this instance, the person in charge of testing specifies, in the form of training data, the scenes to which the individual display screens belong. This makes it possible to generate the identifier that is able to identify the scenes the individual display screens of the target program belong to. Additionally, it is possible to generate the scene transition diagram indicating the scene transitions during the execution. Note that the contents of operation input necessary for scene-to-scene transition in the scene transition diagram can be identified as mentioned earlier by referencing operation content data that is acquired together with the display screen data. Further, when testing is to be executed at first or the contents of operations are not successfully identified by the scene identification section 52, the contents of operations for scene-to-scene transition may also be manually specified by the person in charge of testing.

Subsequently, in a case, for example, where the target program itself or the execution environment (e.g., system software) for the target program is changed, the person in charge of testing is able to automatically test the target program by specifying the test procedure through the scene transition diagram. In this case, the test procedure need not necessarily be the same as the test procedure for the initially executed test. Any test procedure can be specified as long as it is specifiable through the scene transition diagram.

Further, in some cases where, for example, the target program is changed, scene transitions may not be made in a manner specified through the scene transition diagram. For example, in a case where the scene transition diagram indicates that, when a predetermined operation is performed from scene A, a transition is made from scene A to scene B, an additional scene, such as an advertisement, may be inserted between scenes A and B due to a target program change. Even in such a case, the display of scene B after the display of the additional scene can be identified by allowing the scene identification section 52 to perform scene identification with respect to the display screen data. In this instance, the scene transition diagram generation section 53 changes the contents of the scene transition diagram according to the result of identification by the scene identification section 52. As a result, the insertion of a new scene between scenes A and B is reflected in the scene transition diagram. Here, in some cases, the new scene may be a totally unknown scene. However, when the new scene is, for example, an advertisement display screen already presented at a different point of time, the scene identification section 52 is able to identify, through the use of the identifier, that the new scene is such a known scene. Incidentally, in a case where the existing identifier is unable to identify a scene, the personnel can designate the type of the scene as a new scene. This enables the scene identification section 52 to update the contents of the identifier by using the contents of such a new scene as the training data.

Here, the identifier to be used by the scene identification section 52 may be prepared for each target program or may be generated for each genre of the target program. For example, in the case of game programs, game screens of the same genre may be similar to each other. Therefore, when a common identifier is used for identifying the scenes of different types of game programs of the same genre, an identifier previously used for a different game can be used as an identifier for a new game. This reduces the time required for generating an identifier for the new game from scratch. Further, a common identifier may be used, for example, for games in the same series instead of games of the same genre.

Specific examples of processing performed for scene identification by the scene identification section 52 will now be described.

If image data of the display screens is used as-is as the input data for the identifier for scene identification, scene identification may not be made effectively. Therefore, as the input data for the identifier, the scene identification section 52 may use data that is obtained by performing given preprocessing on the image data of the display screens.

For example, as the input data for the identifier, the scene identification section 52 may use a vector image obtained by vectorizing the display screen image data in bitmap format. As a result, the influence caused, for example, by resolution difference between the pieces of image data is reduced when scene identification is made.

Further, the scene identification section 52 may perform a character recognition process of identifying the contents of text included in the display screens, and use text data obtained from the character recognition process as the input data for the identifier. As a result, for example, the menu screen prompting the user to select a plurality of menu items can be accurately identified.

Figure 4:
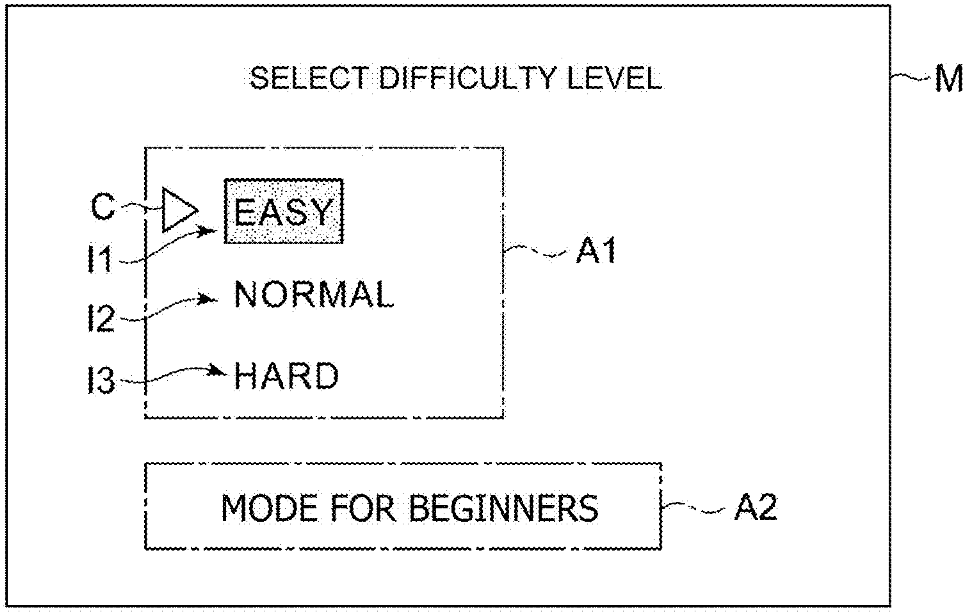
FIG. 4 is a diagram illustrating an example of a menu screen including selectable options.

Further, in the above case, the scene identification section 52 may choose only a predetermined region within a screen as the target for the character recognition process or exclude the predetermined region from the character recognition process. For example, in the menu screen, not only selectable menu items but also an explanation of a currently selected menu item is occasionally displayed at predetermined positions. FIG. 4 illustrates an example of such a menu screen M. The menu screen M includes a menu item display region A1 and an explanation display region A2. The menu item display region A1 displays three selectable menu items I1, I2, and I3 (three difficulty levels in the example of FIG. 4). The explanation display region A2 displays an explanation. The explanation of a currently selected menu item I1 is displayed in the explanation display region A2. When the user moves a cursor C to change the currently selected menu item, the explanation displayed in the explanation display region A2 also changes according to the change made by the user.

In the above example, by using the text data obtained from the character recognition process which is performed on the menu item display region A1, as the input data, the scene identification section 52 is able to identify that a display screen targeted for identification is the menu screen M for difficulty level selection. Alternatively, the scene identification section 52 may perform the character recognition process on a region other than the explanation display region A2 of the screen.

The region on which the character recognition process is to be performed may be determined, for example, by image analysis. For example, the scene identification section 52 compares the pieces of data of display screens acquired over a previous predetermined period of time, including display screens targeted for identification, in order to find a region that varies with time within the display screens. Then, the scene identification section 52 determines that the region found to have varied with time (the explanation display region A2 in the present example) is not targeted for the character recognition process. As a result, scene identification can be efficiently made by using the result of character recognition of the selectable options.

Further, for example, the menu screen occasionally displays a cursor image to indicate a currently selected menu item, adds effects to the currently selected menu item, or changes the color of the background of the currently selected menu item. In such a situation, the accuracy of the character recognition process might decrease, and a change of the currently selected menu item might result in the determination that a different scene is handled. Therefore, by performing image processing, for example, of combining a plurality of the pieces of display screen data acquired over a previous predetermined period of time, the scene identification section 52 may generate data of a screen image indicating a state where no selectable options are chosen. In this case, images displayed in a plurality of display screens targeted for image processing depict a plurality of the same selectable options, one of which is currently selected. In a case where a displayed screen is constantly in a state where one of selectable options is chosen, the generated screen image will not actually be displayed. However, using such screen image data as an input makes it possible to make scene identification regardless of which menu item is selected at a specific point of time.

Further, in addition to the case of the above-described explanation display region A2, a display screen occasionally includes a plurality of regions that present different types of information. In some cases, for example, a region of the display screen displays an advertisement that changes with time. Moreover, a screen displayed during the play of a game having a high real-time capability occasionally includes, for example, a region where the displayed content rapidly changes as the game progresses and a region where the displayed content, such as status information or a message, does not significantly change. If an attempt is made in such a situation to identify the scene on the whole display screen with a single identifier, erroneous scene identification may occur due to changes in the displayed content. Therefore, in a case where it is determined that the display screen includes a plurality of regions where different types of information are displayed due to image recognition, the scene identification section 52 may cause the display screen to be divided into a plurality of regions in order to make scene identification based on the content displayed in each region. More specifically, the scene identification section 52 may input pieces of image data of a plurality of regions included in the display screen to different identifiers, respectively, and make scene identification by using the outputs of the respective identifiers. Alternatively, scene identification may be made of only a plurality of regions included in the display screen that satisfy predetermined conditions (e.g., a region where no significant chronological changes occur).

Further, the scene identification section 52 may make scene identification by using not only the display screen data, but also various types of information outputted by the target program and presented to the user, such as sounds reproduced during target program execution and vibrations generated by the vibration device. For example, the screen acquisition section 51 additionally acquires sound data, such as the volume and wave spectrum of a sound reproduced during the display of a certain display screen, and the scene identification section 52 makes scene identification by inputting the display screen and input data obtained based on the sound data to the identifier. As a result, in a case, for example, where, in a specific scene, a specific sound is played or the volume of a sound changes, scene identification can be made accurately. Further, in a case where the target program generates a vibration in a specific scene, the specific scene can be accurately identified by using the data of the vibration data as the input data for the identifier.

Moreover, while, for example, a game is played, the execution of a specific operation input is occasionally demanded in real time during a short period of time. In order to execute such an operation input at an appropriate point of time when the test execution section 54 performs automated test execution, it is necessary to immediately detect a point of time when such an operation input is executable. Accordingly, the scene identification section 52 may execute a pattern matching process of detecting a predetermined pattern image from the display screen image data, and use the result of execution to identify the scene that requires a predetermined operation input. More specifically, in a case, for example, where a controller of a home video game console is used to perform an operation input with respect to the target program, at a point of time when a predetermined operating member (e.g., a run button or a cancel button) attached to the controller should be operated, the display screen may display a guide image indicating the contents of such an operation. Such a guide image is determined based on the model of the home video game console. Therefore, when games running on the same model are played, it is conceivable that similar images are displayed even if the games have different game titles. Accordingly, the scene identification section 52 prepares the data of a guide image indicating the contents of the above operation, determines, at the time of scene identification, whether or not the guide image is included in the display screen, and uses information regarding the result of determination (information indicating the presence or absence of the guide image and its position within the screen) as the input data for the identifier. This makes it possible to identify a scene in which a predetermined guide image is displayed (i.e., a scene that can accept a specific operation input) by using an identifier that is more lightweight than in the case where the whole image data of the display screen is used as the input data. When the scene in which the guide image displayed is identified as described above, the test execution section 54 is able to perform an operation input indicated by the guide image during the display of the scene, and continue with testing.

The information processing apparatus 10 according to the present embodiment, which has been described above, is able to generate a dynamic scene transition diagram, perform automated test execution based on the scene transition diagram, and thus increase the efficiency of testing conducted by the person in charge of testing.

Note that the embodiment of the present invention is not limited to the one described above. The foregoing description assumes that the information processing apparatus 10 not only generates the scene transition diagram but also conducts testing by using the scene transition diagram. Alternatively, however, the process of generating the scene transition diagram and the process of conducting testing by using the scene transition diagram may be performed respectively by separate pieces of information processing apparatus.

REFERENCE SIGNS LIST

10: Information processing apparatus
11: Control section
12: Storage section
13: Interface section
14: Operating device
15: Display apparatus
51: Screen acquisition section
52: Scene identification section
53: Scene transition diagram generation section
54: Test execution section

The invention claimed is:

1. An information processing apparatus comprising:
one or more processor; and
one or more computer-readable media storing instructions which, when executed by the one or more processors, cause the information processing apparatus to perform operations comprising:
acquiring a plurality of display screens that are displayed chronologically while a target program is executed;
identifying, on a basis of the plurality of display screens, a plurality of scenes presented by the target program, transition relations between the plurality of scenes, and a plurality of user-selectable options on at least one of the plurality of display screens;
(i) generating, on a basis of the plurality of display screens including each of the plurality of user-selectable options, a screen image indicating a state where none of the plurality of selectable options are chosen, and identifying the plurality of selectable options according to the screen image, and/or (ii) identifying, on a basis of a result of comparison between the plurality of display screens, a region where the plurality of user-selectable options are displayed, and identifying the plurality of user-selectable options according to the identified region; and generating a transition diagram that indicates a transition between the plurality of scenes in accordance with steps (i) and/or (ii).

2. The information processing apparatus according to claim 1, wherein the plurality of scenes is identified by using an identifier generated for different types of the target program.

3. The information processing apparatus according to claim 1, wherein the operations further comprise, on a basis of content displayed in each of a plurality of regions included in at least one of the plurality of display screens, identifying a scene presented by the at least one of the plurality of display screens.

4. The information processing apparatus according to claim 1, wherein the operations further comprise vectorizing each of the plurality of display screens to obtain an image; and identifying a scene presented by each of the plurality of the display screens based on the obtained images.

5. The information processing apparatus according to claim 1, wherein the operations further comprise performing a character recognition process on at least one of the plurality of display screens to obtain text information; and identifying a scene presented by the at least one of the plurality of display screens based on the obtained text information.

6. The information processing apparatus according to claim 1, wherein the operations further comprise:

receiving specified test target scenes and scene-to-scene transitions in a state where the transition diagram is displayed; and executing a process of the target program involving the scene-to-scene transitions according to the received specified test target scenes and scene-to-scene transitions.

7. The information processing apparatus according to claim 6, wherein the operations further comprise:

determining whether or not a guide image indicating a given operation is included in at least one of the plurality of display screens; and identifying, on a basis of a result of determination, a scene presented by the at least one of the plurality of display screens, wherein when the scene including the guide image is presented, the operations further comprise inputting contents of the given operation to the target program at a point of time.

8. An information processing method comprising:

acquiring a plurality of display screens that are displayed chronologically while a target program is executed;

identifying, on a basis of the plurality of display screens, a plurality of scenes presented by the target program, transition relations between the plurality of scenes, and a plurality of user-selectable options on at least one of the plurality of display screens;

(i) generating, on a basis of the plurality of display screens including each of the plurality of user-selectable options, a screen image indicating a state where none of the plurality of selectable options are chosen, and identifying the plurality of selectable options according to the screen image, and/or (ii) identifying, on a basis of a result of comparison between the plurality of display screens, a region where the plurality of user-selectable options are displayed, and identifying the plurality of user-selectable options according to the identified region; and generating a transition diagram that indicates a transition between the plurality of scenes in accordance with steps (i) and/or (ii).

9. The information processing method according to claim 8, wherein the plurality of scenes is identified by using an identifier generated for different types of the target program.

10. The information processing method according to claim 8, further comprising, on a basis of content displayed in each of a plurality of regions included in at least one of the plurality of display screens, identifying a scene presented by the at least one of the plurality of display screens.

11. The information processing method according to claim 8, further comprising:

vectorizing each of the plurality of display screens to obtain an image; and identifying a scene presented by each of the plurality of the display screens based on the obtained images.

12. The information processing method according to claim 8, further comprising:

performing a character recognition process on at least one of the plurality of display screens to obtain text information; and identifying a scene presented by the at least one of the plurality of display screens based on the obtained text information.

13. The information processing method according to claim 8, further comprising:

receiving specified test target scenes and scene-to-scene transitions in a state where the transition diagram is displayed; and executing a process of the target program involving the scene-to-scene transitions according to the received specified test target scenes and scene-to-scene transitions.

14. The information processing method according to claim 13, further comprising:

determining whether or not a guide image indicating a given operation is included in at least one of the plurality of display screens; and identifying, on a basis of a result of determination, a scene presented by the at least one of the plurality of display screens, wherein when the scene including the guide image is presented, the method further comprises inputting contents of the given operation to the target program at a point of time.

15. A computer-program product tangibly embodied in a non-transitory machine-readable medium, including instructions configured to cause one or more processors to perform operations comprising:

acquiring a plurality of display screens that are displayed chronologically while a target program is executed;

identifying, on a basis of the plurality of display screens, a plurality of scenes presented by the target program, transition relations between the plurality of scenes, and a plurality of user-selectable options on at least one of the plurality of display screens;

(i) generating, on a basis of the plurality of display screens including each of the plurality of user-selectable options, a screen image indicating a state where none of the plurality of selectable options are chosen, and identifying the plurality of selectable options according to the screen image, and/or (ii) identifying, on a basis of a result of comparison between the plurality of display screens, a region where the plurality of user-selectable options are displayed, and identifying the plurality of user-selectable options according to the identified region; and generating a transition diagram that indicates a transition between the plurality of scenes in accordance with steps (i) and/or (ii).

16. The computer-program product according to claim 15, wherein the operations further comprise, on a basis of content displayed in each of a plurality of regions included in at least one of the plurality of display screens, identifying a scene presented by the at least one of the plurality of display screens.

17. The computer-program product according to claim 15, wherein the operations further comprise:

vectorizing each of the plurality of display screens to obtain an image; and identifying a scene presented by each of the plurality of the display screens based on the obtained images.

18. The computer-program product according to claim 15, wherein the operations further comprise:

performing a character recognition process on at least one of the plurality of display screens to obtain text information; and identifying a scene presented by the at least one of the plurality of display screens based on the obtained text information.

19. The computer-program product according to claim 15, wherein the operations further comprise:

receiving specified test target scenes and scene-to-scene transitions in a state where the transition diagram is displayed; and executing a process of the target program involving the scene-to-scene transitions according to the received specified test target scenes and scene-to-scene transitions.

20. The computer-program product according to claim 19, wherein the operations further comprise:

determining whether or not a guide image indicating a given operation is included in at least one of the plurality of display screens; and identifying, on a basis of a result of determination, a scene presented by the at least one of the plurality of display screens, wherein when the scene including the guide image is presented, the operations further comprise inputting contents of the given operation to the target program at a point of time.

* * * * *